United States Patent
Bialke et al.

(10) Patent No.: US 8,210,062 B2
(45) Date of Patent: Jul. 3, 2012

(54) CONTROL MOMENT GYROSCOPE ARRAY AND METHOD OF POWER DISTRIBUTION THEREFOR

(75) Inventors: William Edward Bialke, Trumansburg, NY (US); Eric Stromswold, Spencer, NY (US)

(73) Assignee: Ithaco Space Systems, Inc., Ithaca, NY (US)

( * ) Notice: Subject to any disclaimer, the term of this patent is extended or adjusted under 35 U.S.C. 154(b) by 1487 days.

(21) Appl. No.: 11/787,967

(22) Filed: Apr. 18, 2007

(65) Prior Publication Data

US 2010/0044517 A1  Feb. 25, 2010

(51) Int. Cl.
G01C 19/30 (2006.01)
G01C 19/10 (2006.01)

(52) U.S. Cl. .......................... 74/5.47; 74/5.22
(58) Field of Classification Search ............. 74/5.47, 74/5.22
See application file for complete search history.

(56) References Cited

U.S. PATENT DOCUMENTS

| | | | | |
|---|---|---|---|---|
| 3,741,500 A | * | 6/1973 | Liden | 244/165 |
| 4,498,015 A | * | 2/1985 | Gottfried | 290/15 |
| 4,723,735 A | * | 2/1988 | Eisenhaure et al. | 244/165 |
| 5,386,738 A | | 2/1995 | Havenhill | |
| 5,751,078 A | * | 5/1998 | Loewenthal | 310/36 |
| 7,111,522 B2 | * | 9/2006 | Wingett et al. | 74/5.7 |
| 2004/0118231 A1 | * | 6/2004 | Peck | 74/5.4 |
| 2007/0137420 A1 | * | 6/2007 | Gutsche | 74/572.1 |
| 2008/0271550 A1 | * | 11/2008 | Muessli | 74/5.7 |
| 2010/0242672 A1 | * | 9/2010 | Gutsche | 74/84 R |

OTHER PUBLICATIONS

NASA Technical Memorandum 85061, "Assessment of Flywheel Energy Storage for Spacecraft Power Systems," G.E. Rodriguez, et al., May 1983.

* cited by examiner

Primary Examiner — David D Le
Assistant Examiner — Jacob S Scott
(74) Attorney, Agent, or Firm — Scott D. Wofsy; Edwards Wildman Palmer LLP

(57) ABSTRACT

An attitude control system for a spacecraft is disclosed that includes a scissored pair of control moment gyroscopes for delivering an output torque to the spacecraft along a an output axis, wherein each gyroscope has a spin motor for spinning a rotor about a rotor axis and a gimbal torque motor for rotating the rotor about a gimbal axis, and wherein the system includes a generator for extracting kinetic energy from the rotors during rotor deceleration to power the gimbal torque motors of the gyroscopes.

13 Claims, 4 Drawing Sheets

CONTROL MOMENT GYROSCOPE ARRAY AND METHOD OF POWER DISTRIBUTION THEREFOR

BACKGROUND OF THE INVENTION

1. Field of the Invention

The subject invention is directed to control moment gyroscopes for providing directional control in a spacecraft, and more particularly, to a system and method for distributing power to an array of control moment gyroscopes.

2. Description of Related Art

Control moment gyroscopes are well known means of providing directional control of spacecraft. One example is described in U.S. Pat. No. 5,386,783 to Havenhill, the disclosure of which is incorporated herein by reference in its entirety. Control moment gyroscopes typically include a rotor, a motor to spin the rotor about a rotor axis, a gimbal, a gimbal torque motor to rotate the gimbal about a gimbal axis and a control system. The control moment gyroscope is mounted within the spacecraft along the axis in which it will induce a torque. The rotor is mechanically supported in the gimbal and is rotated about the gimbal axis, which is normal to the rotor axis.

During operation of the gyroscope, the rotor is spun about its rotor axis by a motor at a predetermined rate. In order to induce a torque on the spacecraft, the gimbal torque motor rotates the gimbal and spinning rotor about the gimbal axis. The rotor is of sufficient mass and is spinning at such a rate that any movement of the rotor out of its plane of rotation will induce a significant torque around an output axis, which is normal to both the rotor axis and the gimbal axis. Torque around the output axis is transferred directly to the spacecraft through a support structure.

In a prior art system, spacecraft bus power is used to spin the rotor and to rotate the gimbal. This power is stored in a battery that is typically charged by solar radiation during periods of spacecraft quiescence. While the rotor is continuously spinning at a predetermined nominal speed and the spin motor is consuming power at constant rate, power to the gimbal torque motor is provided only upon demand. At such a time, the peak power demand can be substantially greater than the normal duty cycle, placing a high demand on spacecraft bus power. It would be beneficial to power a gimbal torque motor without calling upon the spacecraft's bus power. The subject invention provides such a solution, and several other advantages over the prior art, which will become readily apparent from the following detailed description of the invention.

SUMMARY OF THE INVENTION

The subject invention is directed to a new and useful directional control array for a spacecraft that includes first and second control moment gyroscopes (CMGs) arranged as a scissored pair. The first CMG of the scissored pair has a first rotor, a motor to spin the first rotor about a first rotor axis, a first gimbal torque motor to rotate the first rotor about a first gimbal axis that is normal to the first rotor axis. The second CMG of the scissored pair has a second rotor, a motor to spin the second rotor about a second rotor axis, a gimbal torque motor to rotate the second rotor about a second gimbal axis that is normal to the second rotor axis. Because the first and second control moment gyroscopes form a scissored pair array, they have equal rotor spin rates, parallel gimbal axes and equal and opposite gimbal rates. In accordance with the subject invention, the scissored array of CMGs further includes means for extracting kinetic energy from the two rotors as they are decelerated or spun down from a nominal speed, during periods of peak spacecraft torquing. The extracted energy is then used to power the gimbal torque motors, which drive the rotors at a desired gimbal rate to obtain a commanded output torque.

The subject invention is further directed to an attitude control system for a spacecraft that includes an array of three scissored pairs of CMGs. The first scissored pair of CMGs is adapted to deliver an output torque to the spacecraft along a first output axis. Each gyroscope of the first scissored pair has a spin motor for spinning a rotor about a rotor axis and a gimbal torque motor for rotating a gimbal about a gimbal axis that is normal to the rotor axis and the first output axis. The first scissored pair has means for extracting kinetic energy from the rotors of the first scissored pair as those rotors are decelerated to power the gimbal torque motors of the first scissored pair.

The second scissored pair of CMGs is adapted to deliver an output torque to the spacecraft along a second output axis. Each gyroscope in the second scissored pair has a spin motor for spinning a rotor about a rotor axis and a gimbal torque motor for rotating a gimbal about a gimbal axis that is normal to the rotor axis and to the second output axis. The second scissored pair has means for extracting kinetic energy from the rotors of the second scissored pair as those rotors are decelerated to power the gimbal torque motors of the second scissored pair.

The third scissored pair of CMGs is adapted to deliver an output torque to the spacecraft along a third output axis. Each gyroscope in the third scissored pair has a spin motor for spinning a rotor about a rotor axis and a gimbal torque motor for rotating a gimbal about a gimbal axis that is normal to the rotor axis and to the third output axis. The third scissored pair has means for extracting kinetic energy from the rotors of the third scissored pair as those rotors are decelerated to power the gimbal torque motors of the third scissored pair.

The subject invention is also directed to a method of powering a control moment gyroscope, which includes the steps of accelerating or spinning-up a rotor to a given speed during a quiescent period, decelerating or spinning-down the rotor during a period of peak torquing, extracting energy from the decelerating rotor and powering a gimbal torque motor with the extracted energy.

A method of powering a scissored pair of control moment gyroscopes is also disclosed, which includes accelerating the rotors of the scissored pair to a given speed during a quiescent period, simultaneously decelerating the rotors of the scissored pair during a period of peak torquing, extracting energy from the decelerating rotors and powering the gimbal torque motors of the scissored pair with the energy extracted from the decelerating rotors.

The method further includes the steps of returning the rotors of the scissored pair to a nominal speed during a quiescent period. Preferably, the rotors of the scissored pair return to a nominal speed as the gimbal torque motors of the scissored pair precess the rotors at a desired gimbal rate. The precession rate is controlled in such a manner so that the output torque of the scissored pair is zero.

These and other features of the directional control array and associated power distribution system of the subject invention and the manner in which they are employed in a spacecraft will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the spacecraft attitude control system of the subject invention without undue experimentation, preferred embodiments thereof will be described in detail hereinbelow with reference to certain figures, wherein.

DETAILED DESCRIPTION OF PREFERRED EMBODIMENTS

Figure 1:
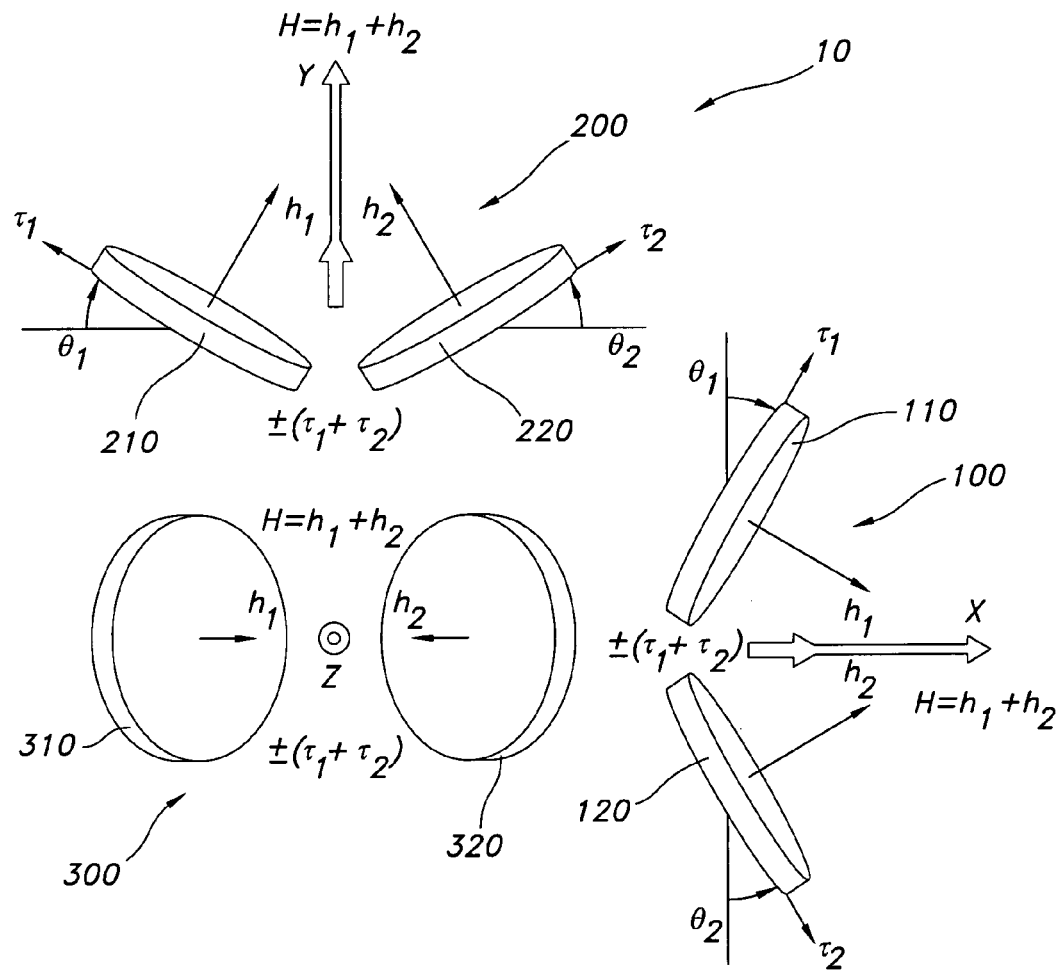
FIG. 1 is a schematic representation of an attitude control system for a spacecraft constructed in accordance with a preferred embodiment of the subject invention, which includes an array of three scissored pairs of control moment gyroscopes.

Referring now to the drawings wherein like reference numerals identify similar structural features or aspects of the subject invention, there is illustrated in FIG. 1 a schematic representation of an attitude control system for a spacecraft constructed in accordance with a preferred embodiment of the subject invention and designated generally by reference numeral 10. Attitude control system 10 includes, among other things, an array of three scissored pairs of control moment gyroscopes (CMGs) that are designated generally by reference numerals 100, 200 and 300. For ease of illustration, each CMG shown in FIG. 1 is represented as a solid disc. However, those skilled in the art will readily appreciate that a CMG typically includes, among other things, a rotor, a motor to spin the rotor about a rotor axis, a gimbal supporting the rotor and a gimbal torque motor to rotate the gimbal about a gimbal axis that is normal to the rotor axis and to the output axis of the CMG.

It is well understood that a scissored pair is an array of two control moment gyroscopes (CMGs) with parallel gimbal axes and equal and opposite gimbal rates. Equivalently, a scissored pair consists of two CMGs with anti-parallel gimbal axes and equal angular velocities. This arrangement ensures that the sum H of the angular momentum of the two CMGs of a scissored pair aligns with a single axis (X, Y or Z), even though the individual angular momentum vectors $h_1$ and $h_2$ of the CMGs tilt away from the output axis, as shown in FIG. 1. Thus, the scissored pair of CMGs always provides an output torque ($\tau_1+\tau_2$) about a fixed output axis. The gimbaled rotors of a scissored pair move in tandem. That is, the gimbal angles $\Theta_1$ and $\Theta_2$ for a scissored pair are always kept constant, either through mechanical means such as gears or through closed-loop control.

There are many benefits associated with the use of a scissored pair of CMGs. For example, unlike a reaction wheel, a scissored pair of CMGs can function in the presence of rotor failures. That is, a complete failure of one rotor will result in a traditional single-gimbal CMG. A partial failure of a rotor (e.g., increased bearing drag) can be accommodated by spinning-down both of the rotors to the same speed. This will prolong the life of the bearing while leaving the output axis direction of the scissored pair the same.

With continuing reference to FIG. 1, the first scissored pair 100 includes CMGs 110 and 120 and is adapted to deliver an output torque to the spacecraft along a first output axis "X". The second scissored pair 200 includes CMGs 210 and 220 and is adapted to deliver an output torque to the spacecraft along a second output axis "Y". The third scissored pair 300 includes CMGs 310 and 320 and is adapted to deliver an output torque to the spacecraft along a third output axis "Z".

Figure 2:
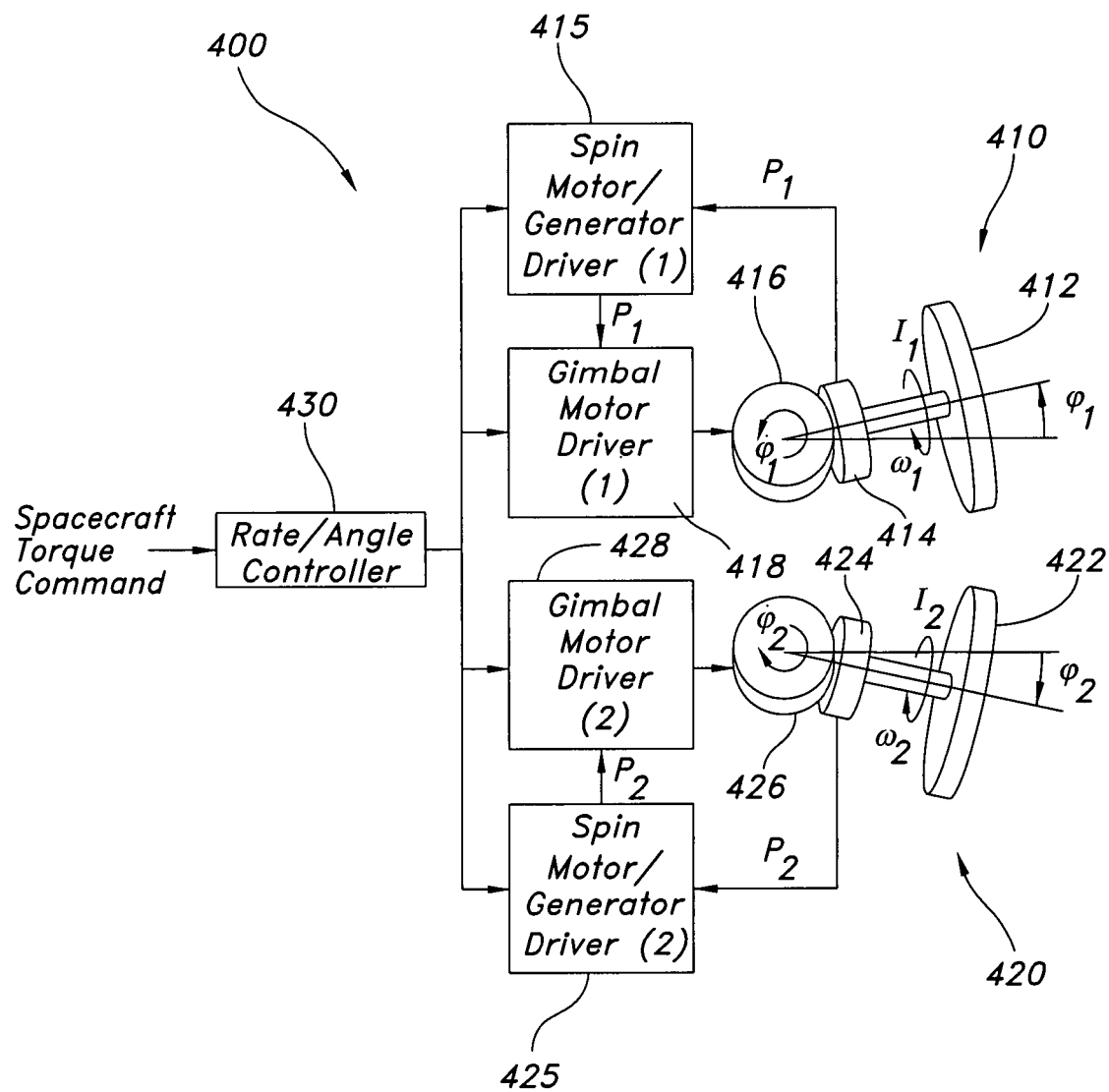
FIG. 2 is a schematic representation of a power distribution system for a scissored pair of control moment gyroscopes constructed in accordance with a preferred embodiment of the subject invention and shown during a period of spacecraft peak torquing.

Referring now to FIG. 2, there is illustrated a schematic representation of a power distribution system 400 associated with a scissored pair of two CMGs 410 and 420 constructed in accordance with a preferred embodiment of the subject invention, during a period of spacecraft peak torquing. CMG 410 includes a rotor 412, a spin motor 414 to spin the rotor 412 at high speed about a rotor axis and for extracting power (i.e., stored kinetic energy) from rotor 412 during rotor deceleration. CMG 410 further includes a gimbal torque motor 416 to rotate the rotor 412 about a gimbal axis that is normal to the rotor axis.

In addition, system 400 includes a spin motor/generator driver 415 and a gimbal motor driver 418. The spin motor/generator driver 415 functions to accelerate or otherwise return the spin motor 414 to a nominal speed during a quiescent or recharging period and to decelerate the spin motor 414 during peak spacecraft torquing so as to extract kinetic energy from the spinning rotor 412. In accordance with the subject invention, the extracted energy is delivered to the gimbal motor driver 418, which uses the energy to power the gimbal torque motor 416.

CMG 420 includes a rotor 422, a spin motor 424 to spin the rotor 422 at high speed about a rotor axis and for extracting power (i.e., stored kinetic energy) from the rotor 422 during rotor deceleration. CMG 420 further includes a gimbal torque motor 426, which rotates the rotor 422 about a gimbal axis that is normal to the rotor axis. A spin motor/generator driver 425 functions to accelerate or spin-up the spin motor 424 to a nominal speed during a quiescent period and to decelerate or spin-down the spin motor 424 during peak spacecraft torquing, so as to extract kinetic energy from the spinning rotor 422. As with CMG 410, the extracted energy from rotor 422 is delivered to a gimbal motor driver 428, which uses the energy to power the gimbal torque motor 426.

The rotors 412, 422 of CMGs 410, 420 are presented in the form of a solid disk of uniform thickness. However, it is envisioned that the rotors 412, 422 could also be in the form of annular rings. For example, a rotor could be in the form of an annular ring with an inner radius equal to 90% of the outer radius. In either instance, the power extracted from each rotor 412, 422 will be a function of the rotor inertia I and rotor rotation rate ω.

Power distribution system 400 further includes a controller 430 that is operatively associated with the spin motor/generator drivers 415, 425 and with the gimbal motor drivers 418, 428. Controller 430 is adapted and configured to control the spin rates of the two rotors 412, 422 and the gimbal angle and gimbal precession rates of the two gimbal torque motors 416, 426 of the scissored pair of CMGs 410 and 420, based upon torque commands received from the spacecraft during a maneuver. Torque commands can be spacecraft-based or ground-based, depending upon the task.

With continuing reference to FIG. 2, during a peak torquing period, the spacecraft will deliver a torque command to controller 430 corresponding to a demanded spacecraft attitude change, requiring a desired output torque along a fixed output axis. In turn, controller 430 will instruct the spin motor/generator drivers 415, 425 to spin-down or otherwise decelerate the spin motors 414, 424 from a nominal rotation rate $\omega_1$ and $\omega_2$ (e.g., 6000 rpm) to a slower rate (e.g., 5500 rpm). Thereupon, the kinetic energy that is stored in the decelerating rotors 414, 424 of the scissored pair of CMGs 410, 420 is extracted from the reversing or counter-rotating spin motors 414, 424 by the spin motor/generator drivers 415, 425. The extracted power $P_1$, $P_2$ is then delivered to the gimbal motor drivers 418, 428 for use in actuating or otherwise driving gimbal torque motors 416, 426. The gimbal torque motors 416, 426 translate in tandem at a controlled gimbal rate to desired gimbal angles $\phi_1$ and $\phi_2$ and thereby achieve the desired output torque for the scissored pair of CMGs 410, 420.

Figure 3:
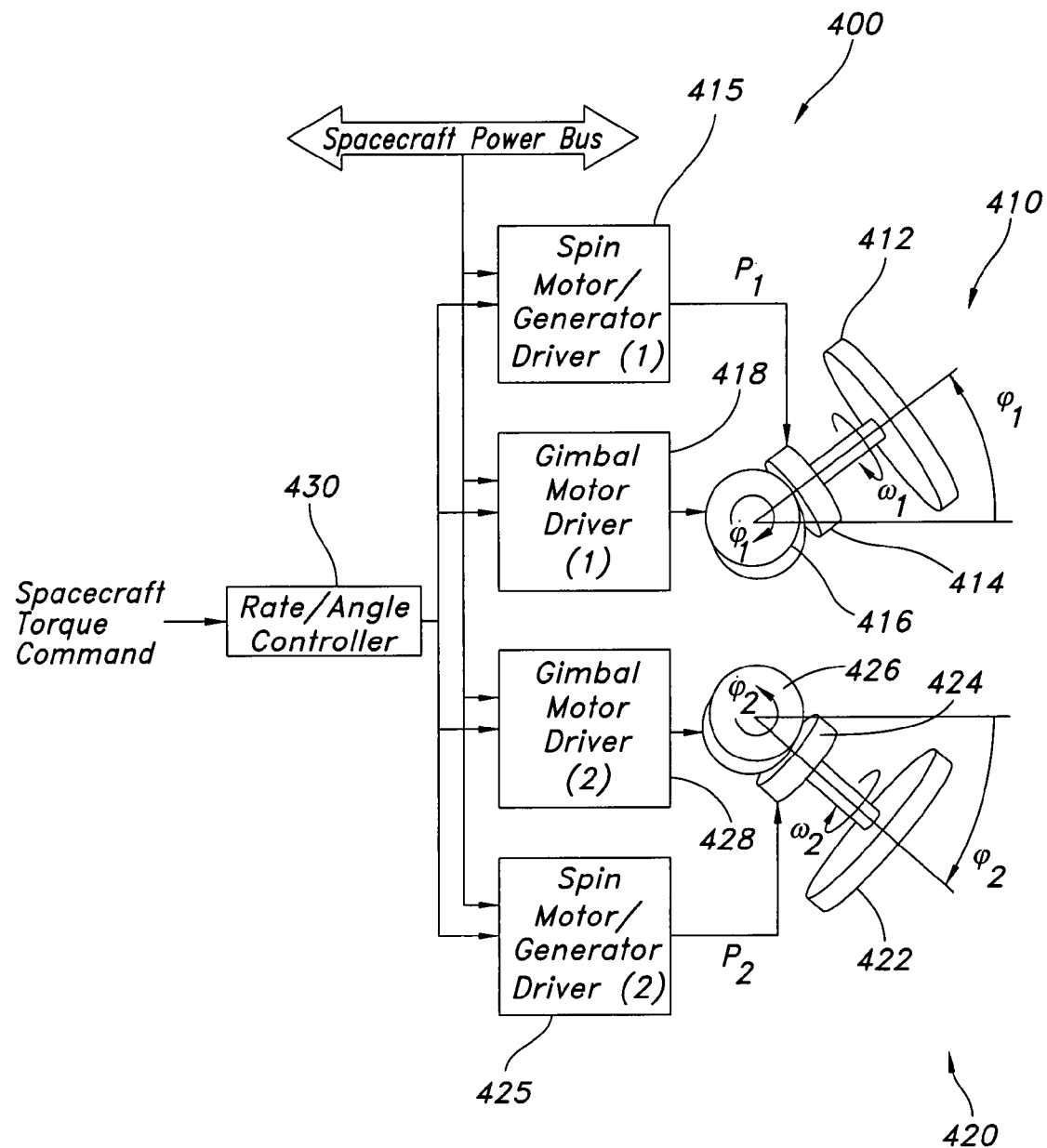
FIG. 3 is a schematic representation of a power distribution system for a scissored pair of control moment gyroscopes constructed in accordance with a preferred embodiment of the subject invention and shown during a period of spacecraft quiescence.

Referring to FIG. 3, after the maneuver has ended, the spacecraft will enter a quiescent period. During that period, controller 430 instructs the spin motor/generator drivers 415, 425 to slowly spin-up or otherwise accelerate the spin motors 414, 424 back to the nominal rotation rate $\omega_1$ and $\omega_2$ (e.g., 6000 rpm). This is done using energy from the spacecraft power bus. Simultaneously, controller 430 instructs the gimbal motor drivers 418, 428 to actuate the gimbal motors 416, 426 and precess the rotors 412, 422 at a desired gimbal rate. This is also done using energy from the spacecraft power bus. To avoid any adverse inertial effects on the spacecraft during the quiescent period, the precession rate of the gimbal torque motors 416, 426 is controlled in such a manner so that the output torque about the fixed output axis of the scissored pair is zero.

In sum, in accordance with the subject invention, to reduce the instantaneous power required by CMGs of a scissored pair array, kinetic energy stored in the two rotors of the scissored pair can be extracted to power gimbal motors without directly affecting the scissored pairs capability and without calling upon spacecraft bus power. Simultaneously spinning down the rotors has no effect on direction of the output torque of the scissored pair, because it always lies along a single axis. Devoting this kinetic energy to gimbal power allows the rotors to be tilted with minimal peak demand on the spacecraft's bus power, as compared to a prior art multi-CMG array.

Figure 4A:
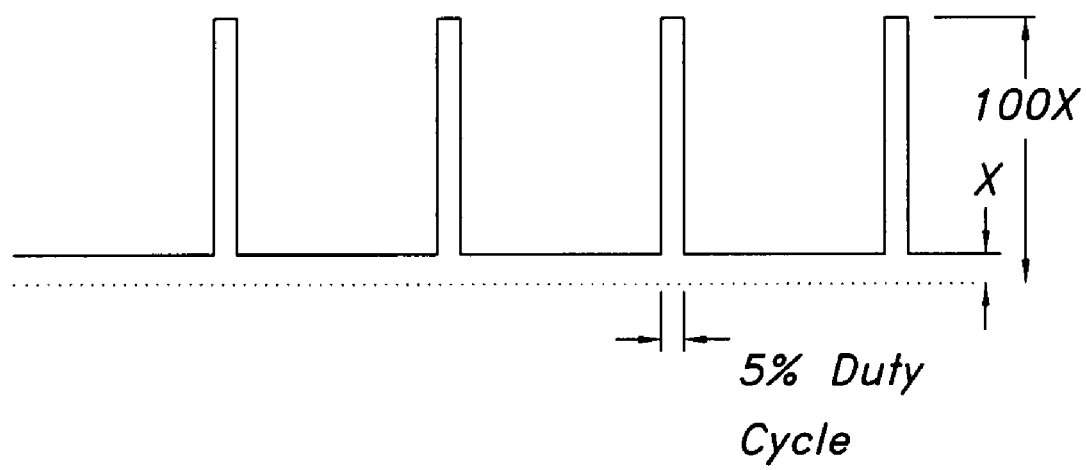
FIGS. 4A and 4B are graphs comparing a prior art power duty cycle to the power duty cycle associated with the power distribution system of the subject invention.
Figure 4B:
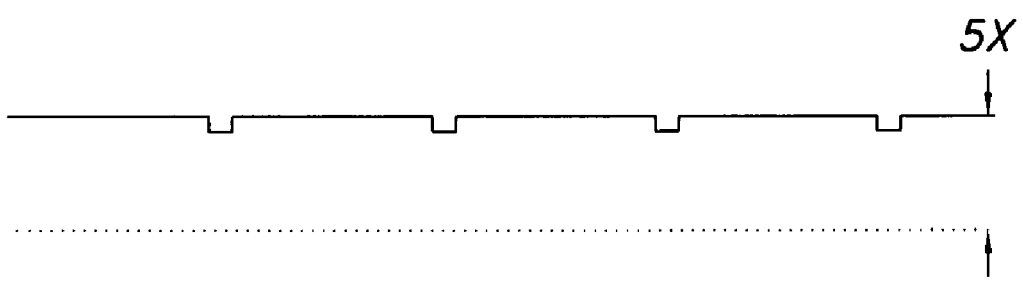

This is exemplified in FIGS. 4A and 4B, wherein FIG. 4A represent the power duty cycle of a spacecraft with a traditional multi-CMG array and FIG. 4B represents the power duty cycle of a spacecraft that includes an array of three scissored pairs of CMGs powered in accordance with the subject invention, as depicted in FIG. 1. As shown, there is a twenty-fold decrease in peak power demand during a power duty cycle in a spacecraft employing the directional control array and associated power distribution system of the subject invention.

After gimbal motion has imparted torque to the spacecraft, the rotors of the scissored pair return to their nominal speeds slowly, during quiescent periods. The lower momentum in the rotors does require faster gimbal motion for a given CMG output torque, but the resulting CMG array performance does not change qualitatively. That is, the momentum envelope of the scissored pair array merely shrinks along one direction in proportion to the decrease in speed. By contrast, a traditional multi-CMG array cannot conveniently alter its rotor spin speed without introducing voids and other highly problematic singularities. The approach set forth by the subject invention represents an advantage that is practical only with high-speed rotors in scissored pairs.

While the power distribution system and associated directional control arrays of the subject invention have been shown and described with reference to preferred embodiments, those skilled in the art will readily appreciate that various changes and/or modifications may be made thereto without departing from the spirit and scope of the subject invention as defined by the appended claims.

What is claimed is:

1. A directional control array for a spacecraft comprising:
   a) a first control moment gyroscope having a first rotor, a first spin motor to spin the first rotor about a first rotor axis, and a first gimbal motor to rotate the first rotor about a first gimbal axis that is normal to the first rotor axis;
   b) a first spin motor/generator driver adapted to extract stored kinetic energy from the first rotor as the first rotor is decelerated during a period of peak spacecraft torquing;
   c) a first gimbal motor driver adapted to receive extracted energy delivered directly from the first spin motor/generator driver to power the first gimbal motor;
   d) a second control moment gyroscope having a second rotor, a second spin motor to spin the second rotor about a second rotor axis, a second gimbal motor to rotate the second rotor about a second gimbal axis that is normal to the second rotor axis;
   e) a second spin motor/generator driver adapted to extract stored kinetic energy from the second rotor as the second rotor is decelerated during said period of peak spacecraft torquing; and
   f) a second gimbal motor driver adapted to receive extracted energy delivered directly from the second spin motor/generator driver to power the second gimbal motor.

2. A directional control array as recited in claim 1, wherein the first and second control moment gyroscopes have parallel gimbal axes.

3. A directional control array as recited in claim 1, further comprising means for controlling gimbal angle and gimbal rate of the first and second gimbal motors.

4. An attitude control system for a spacecraft comprising:
   a) a first scissored pair of control moment gyroscopes for delivering an output torque to the spacecraft along a first output axis, wherein each gyroscope of the first scissored pair has a spin motor for spinning a rotor about a rotor axis and a gimbal motor for rotating the rotor about a gimbal axis that is normal to the rotor axis and the first output axis, the first scissored pair having spin motor driver means for extracting kinetic energy from the rotors of the first scissored pair as those rotors are decelerated during a period of peak spacecraft torquing, and gimbal motor driver means for receiving extracted energy delivered from the spin motor driver means to power the gimbal motors of the first scissored pair without calling upon spacecraft bus power;
   b) a second scissored pair of control moment gyroscopes for delivering an output torque to the spacecraft along a second output axis, wherein each gyroscope in the second scissored pair has a spin motor for spinning a rotor about a rotor axis and a gimbal motor for rotating the rotor about a gimbal axis that is normal to the rotor axis and to the second output axis, the second scissored pair having spin motor driver means for extracting kinetic energy from the rotors of the second scissored pair as those rotors are decelerated during said period of peak spacecraft torquing, and gimbal motor driver means for receiving extracted energy delivered from the spin motor driver means to power the gimbal motors of the second scissored pair without calling upon spacecraft bus power; and c) a third scissored pair of control moment gyroscopes for delivering an output torque to the spacecraft along a third output axis, wherein each gyroscope in the third scissored pair has a spin motor for spinning a rotor about a rotor axis and a gimbal motor for rotating the rotor about a gimbal axis that is normal to the rotor axis and to the third output axis, the third scissored pair having spin motor driver means for extracting kinetic energy from the rotors of the third scissored pair as those rotors are decelerated during said period of peak spacecraft torquing, and gimbal motor driver means for receiving extracted energy delivered from the spin motor driver means to power the gimbal motors of the third scissored pair without calling upon spacecraft bus power.

5. An attitude control system as recited in claim 4, further comprising means for controlling gimbal angle and precession rate of the gimbal torque motors of the first, second and third scissored pairs.

6. A method of powering a control moment gyroscope on a spacecraft, the gyroscope having a rotor and a gimbal motor, the method comprising the steps of:
a) accelerating a rotor to a nominal speed during a quiescent period;
b) decelerating the rotor during a period of peak spacecraft torquing;
c) extracting stored kinetic energy from the decelerating rotor;
d) delivering the energy extracted from the decelerating rotor directly to the gimbal motor; and
e) powering the gimbal motor with the energy extracted from the decelerating rotor to impart torque to the spacecraft.

7. A method according to claim 6, further comprising the step of rotating the rotor at a desired gimbal rate to a desired gimbal angle.

8. A method according to claim 6, further comprising the step of returning the rotor to the nominal speed.

9. A method of powering a scissored pair of control moment gyroscopes on a spacecraft, each control moment gyroscope having a rotor and a gimbal torque motor, the method comprising the steps of:
a) accelerating the rotors of the scissored pair of control moment gyroscopes to a nominal speed during a quiescent period, using energy from a spacecraft power bus;
b) simultaneously decelerating the rotors of the scissored pair of control moment gyroscopes during a period of peak spacecraft torquing;
c) extracting stored kinetic energy from the decelerating rotors;
d) delivering the energy extracted from the decelerating rotors to the gimbal torque motors; and
e) powering the gimbal torque motors of the scissored pair of control moment gyroscopes with the energy extracted from the decelerating rotors to impart torque to the spacecraft, without calling upon spacecraft bus power.

10. A method according to claim 9, further comprising the step of rotating the rotors in tandem at a desired gimbal rate to desired gimbal angles.

11. A method according to claim 10, further comprising the step of returning the rotors of the scissored pair to a nominal speed.

12. A method according to claim 11, wherein the rotors of the scissored pair return to a nominal speed as the gimbal torque motors of the scissored pair precess the rotors at a desired gimbal rate.

13. A method according to claim 12, further comprising the step of controlling the rate at which the gimbal torque motors of the scissored pair precess such that the scissored pair has zero output torque.

* * * * *

UNITED STATES PATENT AND TRADEMARK OFFICE
CERTIFICATE OF CORRECTION

| | |
|---|---|
| PATENT NO. | : 8,210,062 B2 |
| APPLICATION NO. | : 11/787967 |
| DATED | : July 3, 2012 |
| INVENTOR(S) | : William E. Bialke et al. |

Page 1 of 1

It is certified that error appears in the above-identified patent and that said Letters Patent is hereby corrected as shown below:

In the Title Page Item [57], line 3, "along a an output" should be changed to --along an output--.

Signed and Sealed this
Fifth Day of February, 2013

Teresa Stanek Rea
*Acting Director of the United States Patent and Trademark Office*